(12) United States Patent
Chang et al.

(10) Patent No.: US 11,088,749 B2
(45) Date of Patent: Aug. 10, 2021

(54) DEVICE AND METHOD OF USING BRRS CONFIGURATION

(71) Applicant: Apple Inc., Cupertino, CA (US)

(72) Inventors: Wenting Chang, Beijing (CN); Yushu Zhang, Beijing (CN); Gang Xiong, Beaverton, OR (US); Yuan Zhu, Beijing (CN); Huaning Niu, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/079,034

(22) PCT Filed: Jun. 27, 2016

(86) PCT No.: PCT/US2016/039553
§ 371 (c)(1),
(2) Date: Aug. 22, 2018

(87) PCT Pub. No.: WO2017/146758
PCT Pub. Date: Aug. 31, 2017

(65) Prior Publication Data
US 2019/0044601 A1 Feb. 7, 2019

Related U.S. Application Data

(60) Provisional application No. 62/299,924, filed on Feb. 25, 2016.

(51) Int. Cl.
*H04B 7/00* (2006.01)
*H04B 7/06* (2006.01)
(Continued)

(52) U.S. Cl.
CPC ......... *H04B 7/0695* (2013.01); *H04B 7/0626* (2013.01); *H04B 7/08* (2013.01);
(Continued)

(58) Field of Classification Search
CPC ... H04W 76/025; H04W 92/10; H04W 92/14; H04W 72/04; H04W 72/1278; H04W 72/1289; H04L 25/03891
(Continued)

(56) References Cited

U.S. PATENT DOCUMENTS 8,867,493 B2 * 10/2014 Gorokhov ............ H04B 7/0632
370/332
9,077,415 B2 * 7/2015 Josiam .................. H04L 5/0048
(Continued)

FOREIGN PATENT DOCUMENTS

JP  2007228211 A  9/2007
KR  1020140133481 A  11/2014

OTHER PUBLICATIONS

3GPP TS 36.213 V12.8.0 Dec. 2015.*
(Continued)

*Primary Examiner* — Dmitry Levitan
(74) *Attorney, Agent, or Firm* — Kowert, Hood, Munyon, Rankin & Goetzel, P.C.

(57) ABSTRACT

Devices for and methods of beam refinement using a beam refinement reference signal (BRRS) are generally described. A UE receives BRRS information indicating a BRRS position of at least one OFDM symbol in a first or last symbol pair in a subframe. The BRRS replaces the xPDCCH, the last two symbols of data (an xPDSCH or xPUSCH), or is TDMed with a GP. The data and BRRS are allocated to the UE or to different UEs. The BRRS information is provided via an indicator in the DCI or higher layer signaling. The UE refines either the current Rx beam or directly refines a candidate Rx beam and uses one or multiple symbols, as indicated by a BRRS format.

30 Claims, 10 Drawing Sheets

US 11,088,749 B2
Page 2

(51) Int. Cl.
| | |
|---|---|
| *H04L 5/00* | (2006.01) |
| *H04L 27/26* | (2006.01) |
| *H04B 7/08* | (2006.01) |
| *H04W 36/00* | (2009.01) |
| *H04W 72/04* | (2009.01) |
| *H04B 17/309* | (2015.01) |
| *H04B 7/0413* | (2017.01) |

(52) U.S. Cl.
CPC .............. *H04B 7/088* (2013.01); *H04L 5/005* (2013.01); *H04L 5/0048* (2013.01); *H04L 5/0092* (2013.01); *H04L 27/26* (2013.01); *H04L 27/2607* (2013.01); *H04W 36/0022* (2013.01); *H04W 72/042* (2013.01); *H04B 7/0413* (2013.01); *H04B 17/309* (2015.01); *H04L 27/2613* (2013.01)

(58) Field of Classification Search
USPC ......................................... 370/310, 328, 463
See application file for complete search history.

(56) References Cited

U.S. PATENT DOCUMENTS

| | | | | |
|---|---|---|---|---|
| 9,318,794 B2 * | 4/2016 | Chang | .................... | H01Q 1/243 |
| 9,531,573 B2 * | 12/2016 | Rajagopal | ........... | H04L 27/2607 |
| 10,374,664 B2 * | 8/2019 | Yum | .................... | H04B 7/0417 |
| 10,396,878 B2 * | 8/2019 | Bradford | ........... | H04W 72/0413 |
| 10,581,537 B2 * | 3/2020 | Zhang | .................. | H04L 5/0048 |
| 10,582,397 B2 * | 3/2020 | Sun | .................... | H04W 72/0406 |
| 10,779,360 B2 * | 9/2020 | Moon | ................. | H04W 72/042 |
| 2013/0059619 A1 | 3/2013 | Kim et al. | | |
| 2014/0004898 A1 | 1/2014 | Yu et al. | | |
| 2014/0139372 A1 | 5/2014 | Seol et al. | | |
| 2015/0289147 A1 * | 10/2015 | Lou | .................... | H04B 7/0452 370/329 |
| 2019/0007116 A1 * | 1/2019 | Chang | .................. | H04B 7/0684 |
| 2019/0029005 A1 * | 1/2019 | Bendlin | .............. | H04W 72/042 |
| 2019/0044584 A1 * | 2/2019 | Lee | .................... | H04B 7/0456 |
| 2019/0044601 A1 * | 2/2019 | Chang | .............. | H04W 36/0022 |
| 2019/0052331 A1 * | 2/2019 | Chang | .................. | H04B 7/0626 |
| 2019/0058558 A1 * | 2/2019 | Lee | ........................ | H04B 7/088 |
| 2019/0089446 A1 * | 3/2019 | Zhang | .................. | H04L 5/0048 |
| 2019/0149276 A1 * | 5/2019 | Xiong | .................. | H03M 13/09 |
| 2019/0158331 A1 * | 5/2019 | Pawar | .................. | H04L 5/0051 |

OTHER PUBLICATIONS

3GPP TS 36.211 V13.0.0 Dec. 2015.*
"International Application Serial No. PCT/US2016/039553, International Search Report dated Nov. 21, 2016", 5 pgs.
"International Application Serial No. PCT/US2016/039553, Written Opinion dated Nov. 21, 2016", 6 pgs.

* cited by examiner

DEVICE AND METHOD OF USING BRRS CONFIGURATION

PRIORITY CLAIM

This application is a U.S. National Stage Filing under 35 U.S.C. 371 from International Application No. PCT/US2016/039553, filed Jun. 27, 2016 and published in English as WO 2017/146758 on Aug. 31, 2017, which claims the benefit of priority to U.S. Provisional Patent Application Ser. No. 62/299,924, filed Feb. 25, 2016, and entitled "BRRS CONFIGURATION," which is incorporated herein by reference in its entirety.

TECHNICAL FIELD

Embodiments pertain to radio access networks. Some embodiments relate to providing data in cellular and wireless local area network (WLAN) networks, including Third Generation Partnership Project Long Term Evolution (3GPP LTE) networks and LTE advanced (LTE-A) networks as well as 4th generation (4G) networks and 5th generation (5G) networks, all of which are hereinafter referred to as LTE networks. Some embodiments relate to beamforming in LTE networks.

BACKGROUND

The use of 3GPP LTE systems (including LTE and LTE-Advanced systems) has increased due to both an increase in the types of devices user equipment (UEs) using network resources as well as the amount of data and bandwidth being used by various applications, such as video streaming, operating on these UEs. As a result, 3GPP LTE systems continue to develop, with the next generation wireless communication system, 5G aiming to answer the ever-increasing demand for bandwidth.

In particular, carrier aggregation using high frequency bands and Multiple Input Multiple Output (MIMO) systems are being used to increase data rates. MIMO systems use multipath signal propagation to communicate with one or more UEs via multiple signals transmitted by the same evolved NodeB (eNB) on the same or overlapping frequencies that would interfere with each other if they were on the same path. This increase in uplink or downlink data may be dedicated to one UE, increasing the effective bandwidth for that UE by the number of spatial streams (Single User MIMO or SU-MIMO) or may be spread across multiple UEs using different spatial streams for each UE (Multiple User MIMO or MU-MIMO). In beamforming of MU-MIMO systems, in which multiple signals are transmitted in parallel in different directions, selection of the appropriate beam may complicate transmission and reception, especially when the high frequency bands are used.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
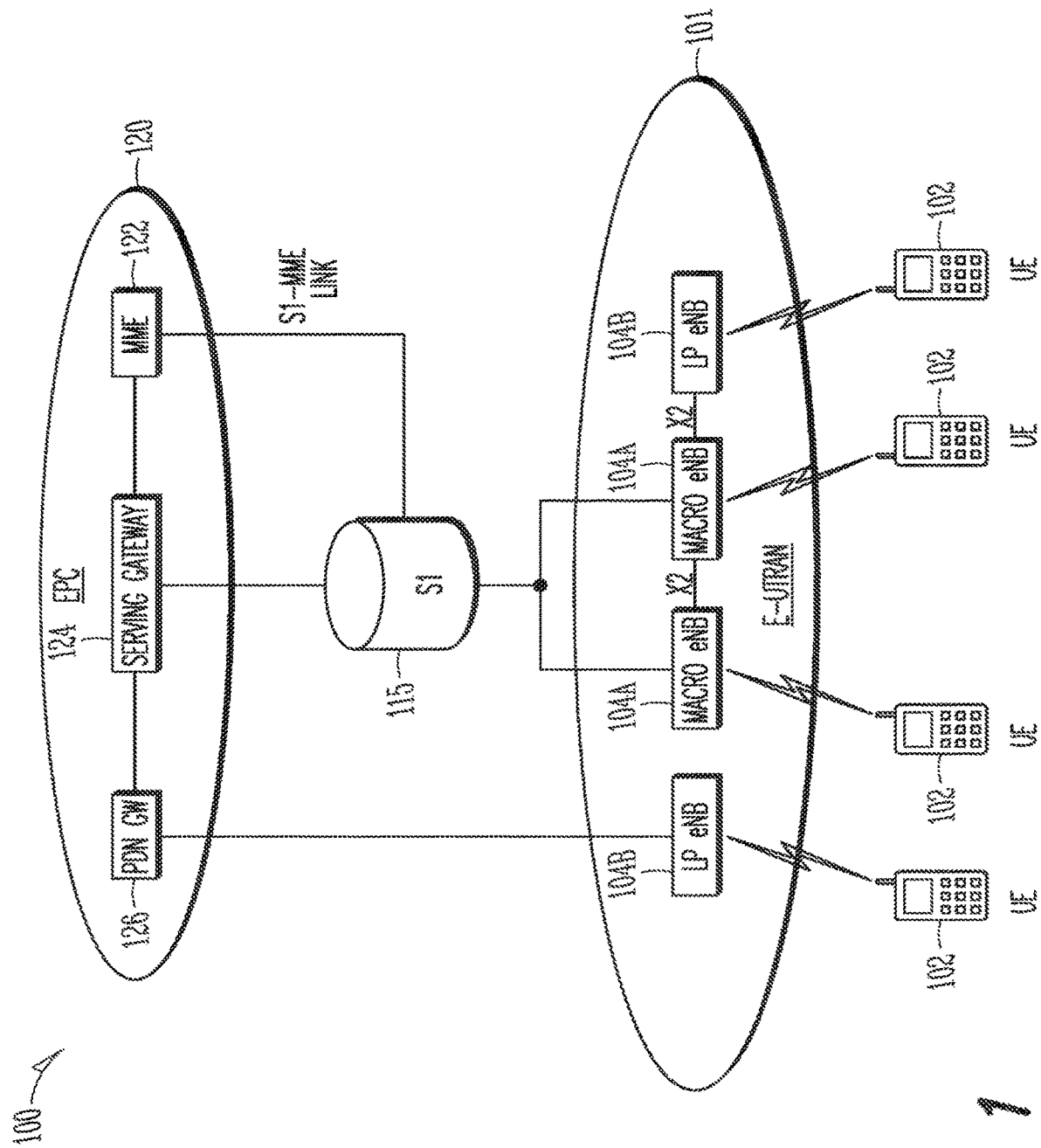
FIG. 1 is a functional diagram of a wireless network in accordance with some embodiments.

FIG. 1 shows an example of a portion of an end-to-end network architecture of a Long Term Evolution (LTE) network with various components of the network in accordance with some embodiments. As used herein, an LTE network refers to both LTE and LTE Advanced (LTE A) networks as well as other versions of LTE networks in development, such as 4G and 5G LTE networks. The network 100 may comprise a radio access network (RAN) (e.g., as depicted, the E-UTRAN or evolved universal terrestrial radio access network) 101 and core network 120 (e.g., shown as an evolved packet core (EPC)) coupled together through an S1 interface 115. For convenience and brevity, only a portion of the core network 120, as well as the RAN 101, is shown in the example.

The core network 120 may include a mobility management entity (MME) 122, serving gateway (serving GW) 124, and packet data network gateway (PDN GW) 126. The RAN 101 may include evolved node Bs (eNBs) 104 (which may operate as base stations) for communicating with user equipment (UE) 102. The eNBs 104 may include macro eNBs 104a and low power (LP) eNBs 104b. The eNBs 104 and UEs 102 may employ the techniques as described herein.

The MME 122 may be similar in function to the control plane of legacy Serving GPRS Support Nodes (SGSN). The MME 122 may manage mobility aspects in access such as gateway selection and tracking area list management. The serving GW 124 may terminate the interface toward the RAN 101, and route data packets between the RAN 101 and the core network 120. In addition, the serving GW 124 may be a local mobility anchor point for inter-eNB handovers and also may provide an anchor for inter-3GPP mobility. Other responsibilities may include lawful intercept, charging, and some policy enforcement. The serving GW 124 and the MME 122 may be implemented in one physical node or separate physical nodes.

The PDN GW 126 may terminate a SGi interface toward the packet data network (PDN). The PDN GW 126 may route data packets between the EPC 120 and the external PDN, and may perform policy enforcement and charging data collection. The PDN GW 126 may also provide an anchor point for mobility devices with non-LIE access. The external PDN can be any kind of IP network, as well as an IP Multimedia Subsystem (IMS) domain. The PDN GW 126 and the serving OW 124 may be implemented in a single physical node or separate physical nodes.

The eNBs 104 (macro and micro) may terminate the air interface protocol and may be the first point of contact for a UE 102. In some embodiments, an eNB 104 may fulfill various logical functions for the RAN 101 including, but not limited to, RNC (radio network controller) functions such as radio bearer management, uplink and downlink dynamic radio resource management and data packet scheduling, and mobility management. In accordance with embodiments, UEs 102 may be configured to communicate orthogonal frequency division multiplexed (OFDM) communication signals with an eNB 104 over a multicarrier communication channel in accordance with an OFDMA communication technique. The OFDM signals may comprise a plurality of orthogonal subcarriers.

The S1 interface 115 may be the interface that separates the RAN 101 and the EPC 120. It may be split into two parts: the S1-U, which may carry traffic data between the eNBs 104 and the serving GW 124, and the S1-MME, which may be a signaling interface between the eNBs 104 and the MME 122. The X2 interface may be the interface between eNBs 104. The X2 interface may comprise two parts, the X2-C and X2-U. The X2-C may be the control plane interface between the eNBs 104, while the X2-U may be the user plane interface between the eNBs 104.

With cellular networks, LP cells 104b may be typically used to extend coverage to indoor areas where outdoor signals do not reach well, or to add network capacity in areas with dense usage. In particular, it may be desirable to enhance the coverage of a wireless communication system using cells of different sizes, macrocells, microcells, picocells, and femtocells, to boost system performance. The cells of different sizes may operate on the same frequency band, or may operate on different frequency bands with each cell operating in a different frequency hand or only cells of different sizes operating on different frequency bands. As used herein, the term LP eNB refers to any suitable relatively LP eNB for implementing a smaller cell (smaller than a macro cell) such as a femtocell, a picocell, or a microcell. Femtocell eNBs may be typically provided by a mobile network operator to its residential or enterprise customers. A femtocell may be typically the size of a residential gateway or smaller and generally connect to a broadband line. The femtocell may connect to the mobile operator's mobile network and provide extra coverage in a range of typically 30 to 50 meters. Thus, a LP eNB 104b might be a femtocell eNB since it is coupled through the PDN GW 126. Similarly, a picocell may be a wireless communication system typically covering a small area, such as in-building (offices, shopping malls, train stations, etc.), or more recently in-aircraft. A picocell eNB may generally connect through the X2 link to another eNB such as a macro eNB through its base station controller (BSC) functionality. Thus, LP eNB may be implemented with a picocell eNB since it may be coupled to a macro eNB 104a via an X2 interface. Picocell eNBs or other LP eNBs LP eNB 104b may incorporate some or all functionality of a macro eNB LP eNB 104a. In some cases, this may be referred to as an access point base station or enterprise femtocell.

Communication over an LTE network may be split up into 10 ms radio frames, each of which may contain ten 1 ms subframes. Each subframe of the frame, in turn, may contain two slots of 0.5 ms. Each subframe may be used for uplink (UL) communications from the UE 102 to the eNB 104 or downlink (DL) communications from the eNB 104 to the UE. In one embodiment, the eNB 104 may allocate a greater number of DL communications than UL communications in a particular frame. The eNB 104 may schedule transmissions over a variety of frequency bands. Each slot of the subframe may contain 6-7 OFDM symbols, depending on the system used. In one embodiment, each subframe may contain 12 subcarriers. In the 5G system, however, the frame size (ms), the subframe size and number of subframes within a frame, as well as the frame structure, may be different from that of a 4G or UE system. The subframe size, as well as number of subframes in a frame, may also vary in the 5G system from frame to frame. For example, while the frame size may remain at 10 ms in the 5G system for downward compatibility, the subframe size may be decreased to 0.2 ms or 0.25 ms to increase the number of subframes in each frame.

A downlink resource grid may be used for downlink transmissions from an eNB 104 to a UE 102, while an uplink resource grid may be used for uplink transmissions from a UE 102 to an eNB 104 or from a UE 102 to another UE 102. The resource grid may be a time-frequency grid, which is the physical resource in the downlink in each slot. The smallest time-frequency unit in a resource grid may be denoted as a resource element (RE). Each column and each row of the resource grid may correspond to one OFDM symbol and one OFDM subcarrier, respectively. The resource grid may contain resource blocks (RBs) that describe the mapping of physical channels to resource elements and physical RBs (PRBs). A PRB may be the smallest unit of resources that can be allocated to a UE. A RB in some embodiments may be 180 kHz wide in frequency and 1 slot long in time. In frequency, RBs may be either 12×15 kHz subcarriers or 24×7.5 kHz subcarriers wide, dependent on the system bandwidth. In Frequency Division Duplexing (FDD) systems, both the uplink and downlink frames may be 10 ms and frequency (fill-duplex) or time (half-duplex) separated. The duration of the resource grid 400 in the time domain corresponds to one subframe or two resource blocks. Each resource grid may comprise 12 (subcarriers)*14 (symbols) =168 resource elements.

Each OFDM symbol may contain a cyclic prefix (CP) which may be used to effectively eliminate Inter Symbol Interference (ISI), and a Fast Fourier Transform (FFT) period. The duration of the CP may be determined by the highest anticipated degree of delay spread. Although distortion from the preceding OFDM symbol may exist within the CP, with a CP of sufficient duration, preceding OFDM symbols do not enter the FFT period. Once the ITT period signal is received and digitized, the receiver may ignore the signal in the CP.

There may be several different 5G physical downlink channels that are conveyed using such resource blocks, including the 5G physical downlink control channel (xPDCCH) and the 5G physical downlink shared channel (xPDSCH). Each downlink subframe may be partitioned into the xPDCCH and the xPDSCH, and perhaps additional signals, as discussed below. The xPDCCH may occupy the first two symbols of each subframe and carry, among other information, information about the transport format and resource allocations related to the xPDSCH channel, as well as allocation and H-ARQ information related to the 5G uplink shared channel (xPUSCH). The xPDSCH may carry user data and higher layer signaling to a UE and, in some embodiments, occupy the remainder of the subframe. Typically, downlink scheduling (assigning control and shared channel resource blocks to UEs within a cell) may be performed at the eNB based on channel quality information provided from the UEs to the eNB, and then the downlink resource assignment information may be sent to each UE on the xPDCCH used for (assigned to) the UE. The xPDCCH may contain downlink control information (DCI) in one of a number of formats that indicate to the UE how to find and decode data, transmitted on the xPDSCH in the same subframe, from the resource grid. The DCI format may provide details such as number of resource blocks, resource allocation type, modulation scheme, transport block, redundancy version, coding rate etc. Each DCI format may have a cyclic redundancy code (CRC) and be scrambled with a Radio Network Temporary Identifier (RNTI) that identifies the target UE for which the xPDSCH is intended. Use of the UE-specific RNTI may limit decoding of the DCI format (and hence the corresponding xPDSCH) to only the intended UE.

Various types of reference signals may be transmitted by the eNB 104 for a UE 102 to measure. The reference signals may include, for example, cell-specific reference signals (CRS) and UE-specific reference signals, e.g., demodulation reference signals (DMRS). The CRS may be used for cell search and initial acquisition, demodulation and channel quality estimation. The DMRS may be used for PDSCH demodulation by the UE, as well as for handover. The number and type of downlink reference signals has increased with newer generations of LTE networks, which has led to issues due to the increased number of antennas, antenna panels and antenna ports. In particular, the eNB and/or UE may use specific reference signals in beamforming to increase data throughput or quality. Different reference signals may be transmitted by the eNB in each beam for power measurement by the UEs serviced by the eNB and beam selection. These reference signals may be referred to as Beamformed Reference Signals (BRSs) and may be located in different symbols within a specific BRS subframe. The eNB may transmit different beam formed reference signals in the PDSCH on the different antennas. In particular, the different beamformed reference signal may use different sequences to enable the UE to distinguish between the various beamformed reference signals. The sequences may be similar to those used for Secondary Synchronization Signal (SSS) sequences, which may be an interleaved concatenation of two length-31 binary sequences scrambled with a scrambling sequence given by the Primary Synchronization Signal (PSS), In some embodiments, the BRS transmitted from each eNB antenna port may be a cyclic shift of a base sequence. In some embodiments, the UE may perform a scan to determine which BRS to measure the BRS receive power (BRS-RP) and subsequently transmit BRS-RP information as well as identity information of the beam and UE. This information, for example, may enable the eNB to determine the best direction for transmitting data to the UE.

In some embodiments, Channel State Information (CSI) measurements may be used to estimate the channel quality. CSI measurements may measure CRS, CSI Reference Signals (CSI-RS) or other Channel State Information-Interference Measurement (CSI-IM) signals transmitted by the eNB. From the measurements, calculations of the channel quality may be subsequently determined and reported to the eNB. The CSI report may include a Channel Quality Indicator (CQI) and may be sent from the UE to the eNB to indicate a suitable downlink transmission data rate, i.e., a Modulation and Coding Scheme (MCS) value, for communications with the UE. The information provided by the CQI may include both channel quality and desired transport block size.

The system shown in FIG. 1 may also support MU-MIMO and massive MIMO. Massive MIMO may use hundreds or thousands of antennas over multiple terminals and eNBs, each of which may be equipped with arrays of active antenna elements. Signals sent using a set of antennas at a particular angle is referred to as a beam. Each beam may have one or more transmission angles, as well as an angular volume or a set of allowable ranges for the transmission angles. For example, a beam may be associated with a horizontal angle, which allows the antennas on an eNB to track a UE as it moves across a coverage area horizontally, and with a vertical angle that changes as a height of the UE or a distance of UE from the eNB changes. For a fixed set of antennas that generate the beam, this range will be limited, and the UE is passed to different beams or channels when the UE moves outside the area of coverage for a particular beam.

An eNB can schedule a best transmission beam and a surrounding transmission beam within a CSI process. The Antenna Ports (APs) (e.g. the fixed address ports for each antenna out of all of the antennas of the eNB) transmitting the best beam for a CSI-RS group may be explicitly configured via RRC signaling. The CSI processes thus measure the performance of channels on particular beams using the beamformed reference signals transmitted by those beams. RRC signaling may be used to select multiple beams for transmission of data from the eNB to the UE when quality thresholds are within certain parameters. Different structures for the CSI processes may be used. For example, in some embodiments, each beam may have separate CSI processes, and the eNB may configure a transmission beam index for each CSI-RS group in a CSI process by RRC signaling. The UE may provide to the eNB CSI or CQI feedback for at least some of the beams provided by the eNB. In some embodiments, each of beams are configured as CSI-RS. Each beam may have different polarizations, leading to a number of MIMO layers being used for each beam.

In MU-MIMO or massive MIMO, Tx beamforming and Rx beamforming may be applied simultaneously. Beam Refinement Reference Signals (BRRS) may be used for beam refinement. In at least one case, to support a repeated BRRS signal, a wider subcarrier spacing or time domain replica waveform may be used. The BRRS can be generated within one OFDM symbol, using frequency domain down-sampling which changes the sampling band edge and scales the amplitude of the sampled signal. By the down-sampling, the number of time-domain samples can be reduced so that the subcarrier spacing can be increased. The BRRS may be generated using a Zadoff-Chu sequence. The sequence may be a function of slot number, cyclic shift, virtual cell ID, the number of antenna ports, an antenna-port-to-cyclic-shift mapping function where the cyclic shift is determined by a hash table, and the number of BRRS subcarriers. The sequence may be mapped to resource elements on antenna ports as a function of the number of BRRS sequence replicas in one symbol the total number of downlink resource blocks and the subcarrier number per resource block. The BRRS, as indicated below, can be mapped to multiple BRRS symbols with repeated pattern and sequence, where the number of BRRS symbols may be defined by the system or indicated by the Downlink Control Information (DCI) and may be transmitted in one or more OFDM symbols.

Figure 2:
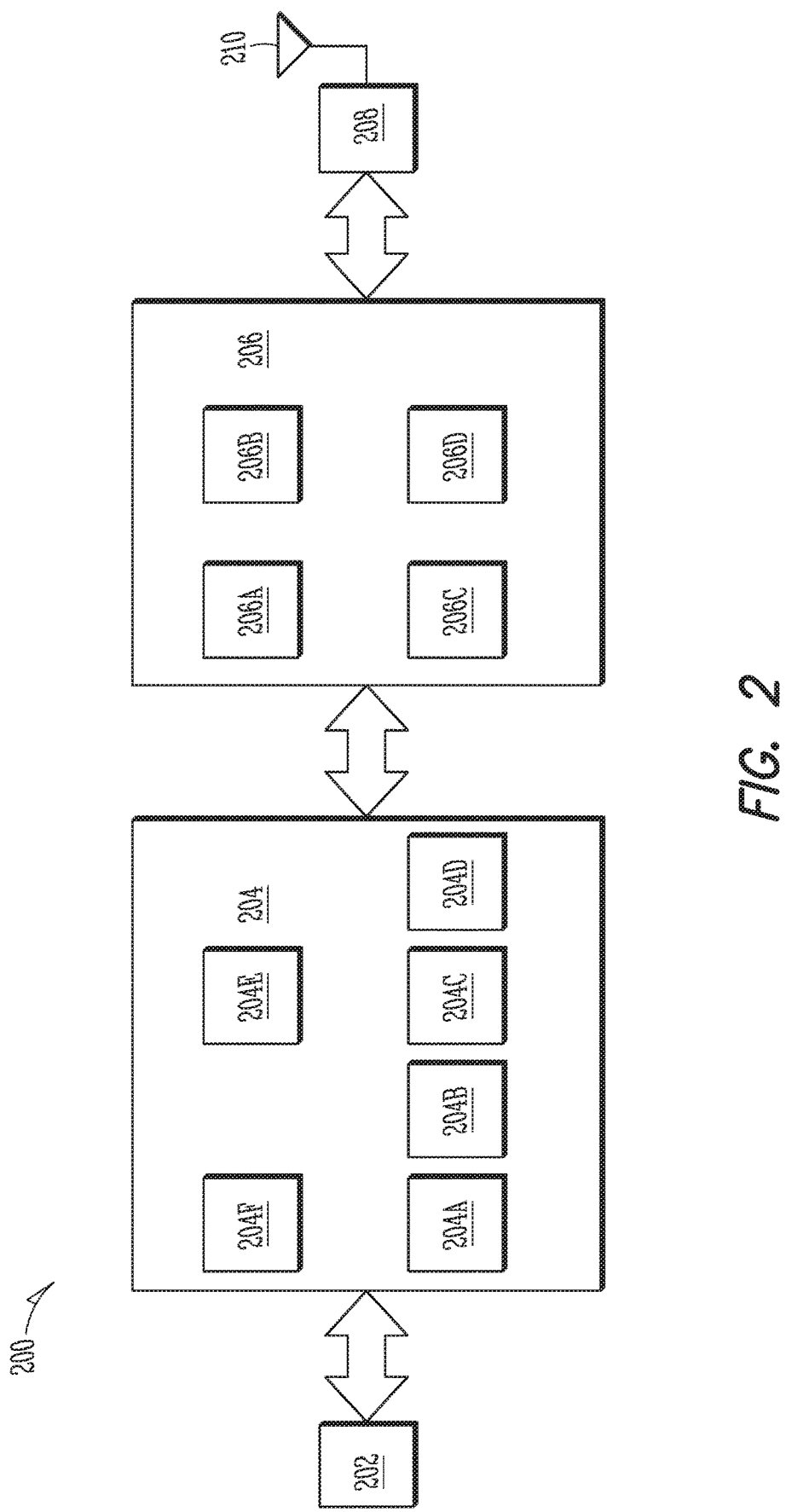
FIG. 2 illustrates components of a communication device in accordance with some embodiments.

Embodiments described herein may be implemented into a system using any suitably configured hardware and/or software. FIG. 2 illustrates components of a UE in accordance with some embodiments. At least some of the components shown may be used in the UE 102 (or eNB 104) shown in FIG. 1. The UE 200 and other components may be configured to use the synchronization signals as described herein. The UE 200 may be one of the UEs 102 shown in FIG. 1 and may be a stationary, non-mobile device or may be a mobile device. In some embodiments, the UE 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may than a transceiver. In some embodiments, other network elements, such as the eNB may contain some or all of the components shown in FIG. 2. Other of the network elements, such as the MME, may contain an interface, such as the S1 interface, to communicate with the eNB over a wired connection regarding the UE.

The application or processing circuitry 202 may include one or more application processors. For example, the application circuitry 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one or more single-core or multi-core processors. The baseband circuitry 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 5G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include FFT, precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC. RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented together such as, for example, on a system on a chip (SOC).

In some embodiments, the baseband circuitry 204 may provide for communication compatible with one or more radio technologies. For example, in some embodiments, the baseband circuitry 204 may support communication with an evolved universal terrestrial radio access network (OUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol may be referred to as multi-mode baseband circuitry. In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GUAM, universal mobile telecommunications system (UMTS), UMTS terrestrial radio access network (UTRAN), or other 2G. 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RE circuitry 206 may include mixer circuitry 206a, amplifier circuitry 206b and filter circuitry

206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove, unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar convener.

FEM circuitry 208 may include a receive signal path which may include circuitry configured to operate on RF signals received from one or more antennas 210, amplify the received signals and provide the amplified versions of the received signals to the RF circuitry 206 the further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or inure filters to generate RF signals for subsequent transmission by one or more of the one or more antennas 210.

In some embodiments, the UE 200 may include additional elements such as, for example, memory/storage, display, camera, sensor, and/or input/output (I/O) interface as described in more detail below. In some embodiments, the UE 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the LE 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
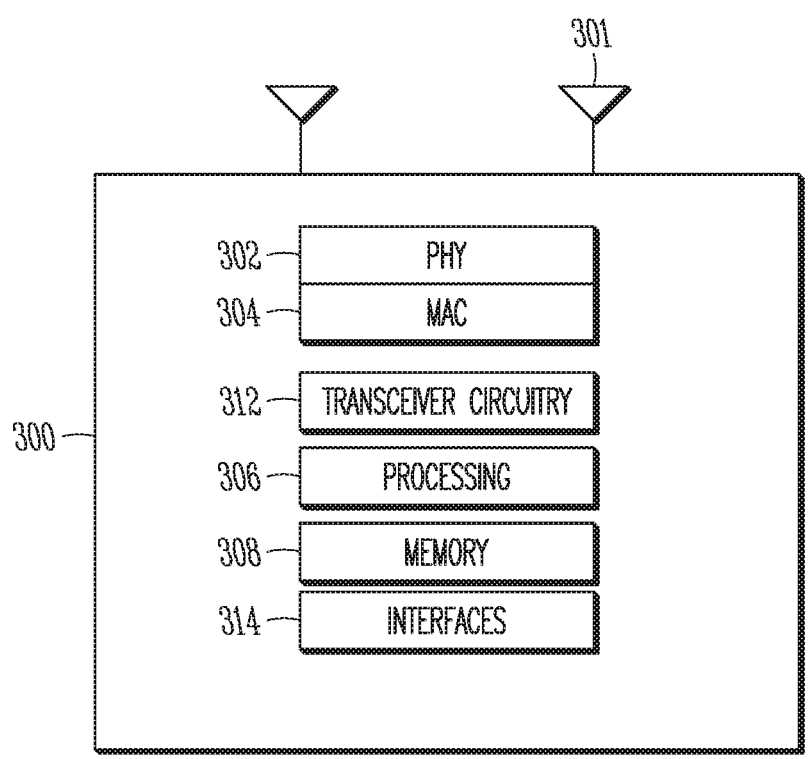
FIG. 3 illustrates a block diagram of a communication device in accordance with some embodiments.

FIG. 3 is a block diagram of a communication device in accordance with some embodiments. The device may be a UE or eNB, for example, such as the UE 102 or eNB 104 shown in FIG. 1 that may be configured to track the UE as described herein. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a NYMAN, a WLAN, and a WPAN. In some embodiments, the communication device 300 can be configured to operate in accordance with 3GPP standards or other protocols or standards, including WiMax, WiFi, WiGig, GSM, EDGE, GERAN, UNITS, UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range. The antennas 301 may be similar to those described in relation to antennas 210.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs, RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

Figure 4:
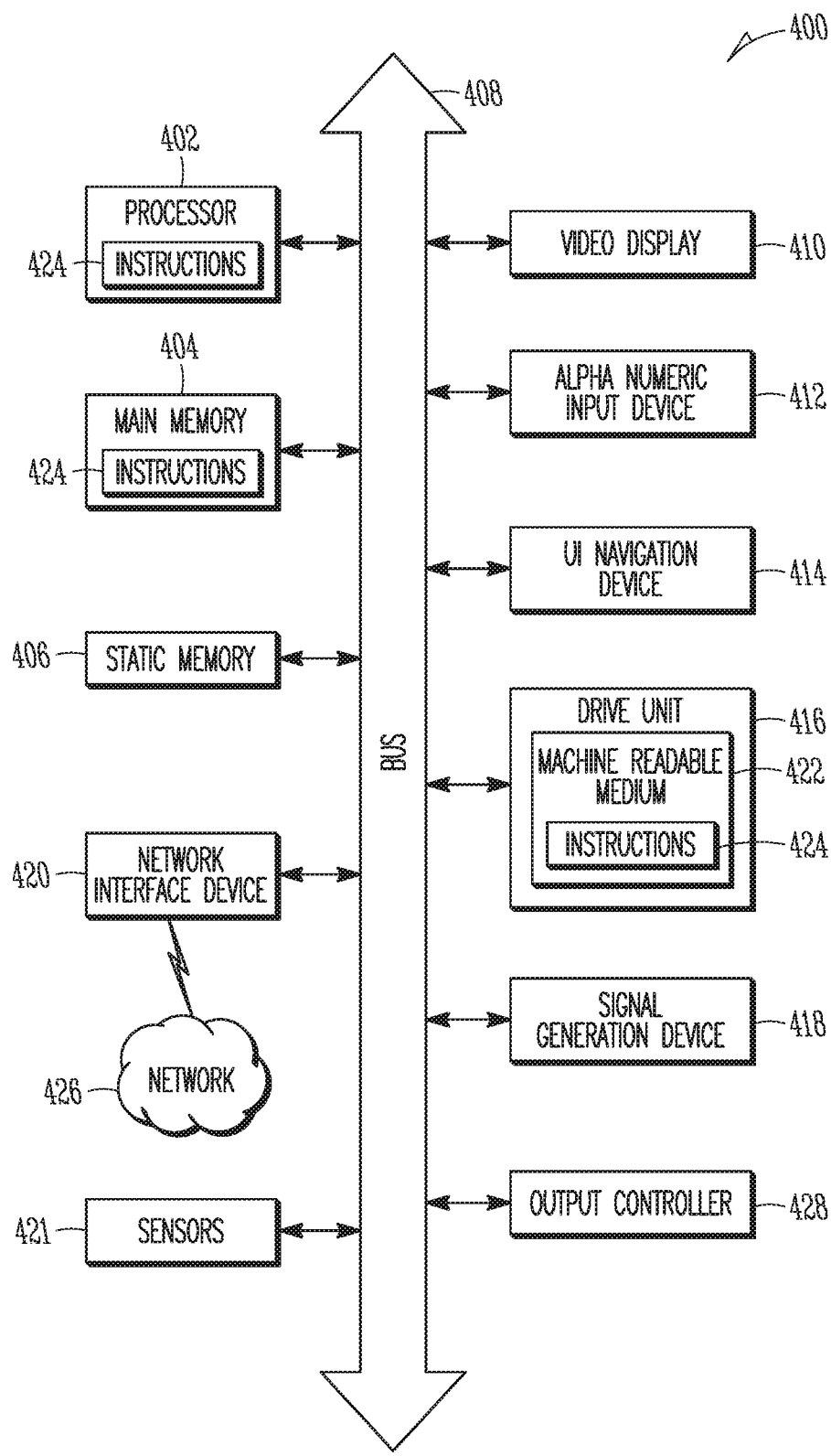
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2) (or other distributed) network environment. The communication device 400 may be a eNB, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or inure hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As discussed above, the eNB may have multiple antennas that may be used in various groupings and with various signal modifications for each grouping to produce a plurality of APs. Each AP may be defined for one or more antennas. Each AP may correspond to a different transmission signal direction. Using the different APs, the eNB may transmit multiple layers with codebook-based or non-codebook-based precoding techniques. Each AP may correspond to a beam that transmits AP-specific CSI-RS signals. The UE may contain a plurality of receive antennas that may be used selectively to create Rx beamforming. Rx beamforming may be used to increase the receive antenna (beamforming) gain for the direction(s) on which desired signals are received, and to suppress interference from neighboring cells. Fast Rx beam refinement, in which the Rx beam direction is dynamically adjusted in response to the channel conditions measured by the UE, is desirable from a performance standpoint.

This may be particularly desirable due to the upcoming use of the high frequency band around, for example, 28 GHz, 37 GHz, 39 GHz and 64-71 GHz, used in conjunction with carrier aggregation, which may permit networks to continue to service the never ending hunger for data delivery. The increased beamforming gain in this frequency range may permit the UE and eNB to compensate for the increasingly likely event of severe pathloss and suppress mutual user interference, leading to an increase in system capacity and coverage.

To maximize the beamforming gain, as indicated above the UE may search for an optimum Tx/Rx beam pair using the BRS. However, the BRS is a broadcast signal that is transmitted periodically on all Tx beams in a fixed manner. This means that to detect the BRS, the UE may have to wait until the next BRS subframe for Rx beam refinement if the UE has just missed the BRS. This, however, may not be fast enough in some circumstances. In addition or instead of using the BRS, the CSI RS or Sounding RS (SRS) also can be utilized for Rx beam refinement. In this case, however, the Tx beams on the RS used are limited to the most recent reported BRS measurement. Thus, a BRRS may be produced for transmission on the same Tx beam as data to be transmitted to the UE.

To achieve faster Rx beam refinement and update the Rx beam, a BRRS may be transmitted on the same Tx beam as data to be transmitted to the UE. The BRRS, in temporal proximity with the data OFDM symbols (e.g., within 6, 13 or 25 ms), establish an association between the BRRS and the data on the same Tx beam. Multiple BRRS symbols may be transmitted using the same Tx beam. Such Rx-beam refinement may enable the UE and eNB to use the selected beam to communicate more effectively. However, not all UEs may use BRRS symbols. This may result in the BRRS symbols of one set of UEs and the data symbols of another set of UES to cause mutual interference with each other. To avoid the interference, BRRS symbol mapping and a specific BRRS format may be used.

Figure 5:
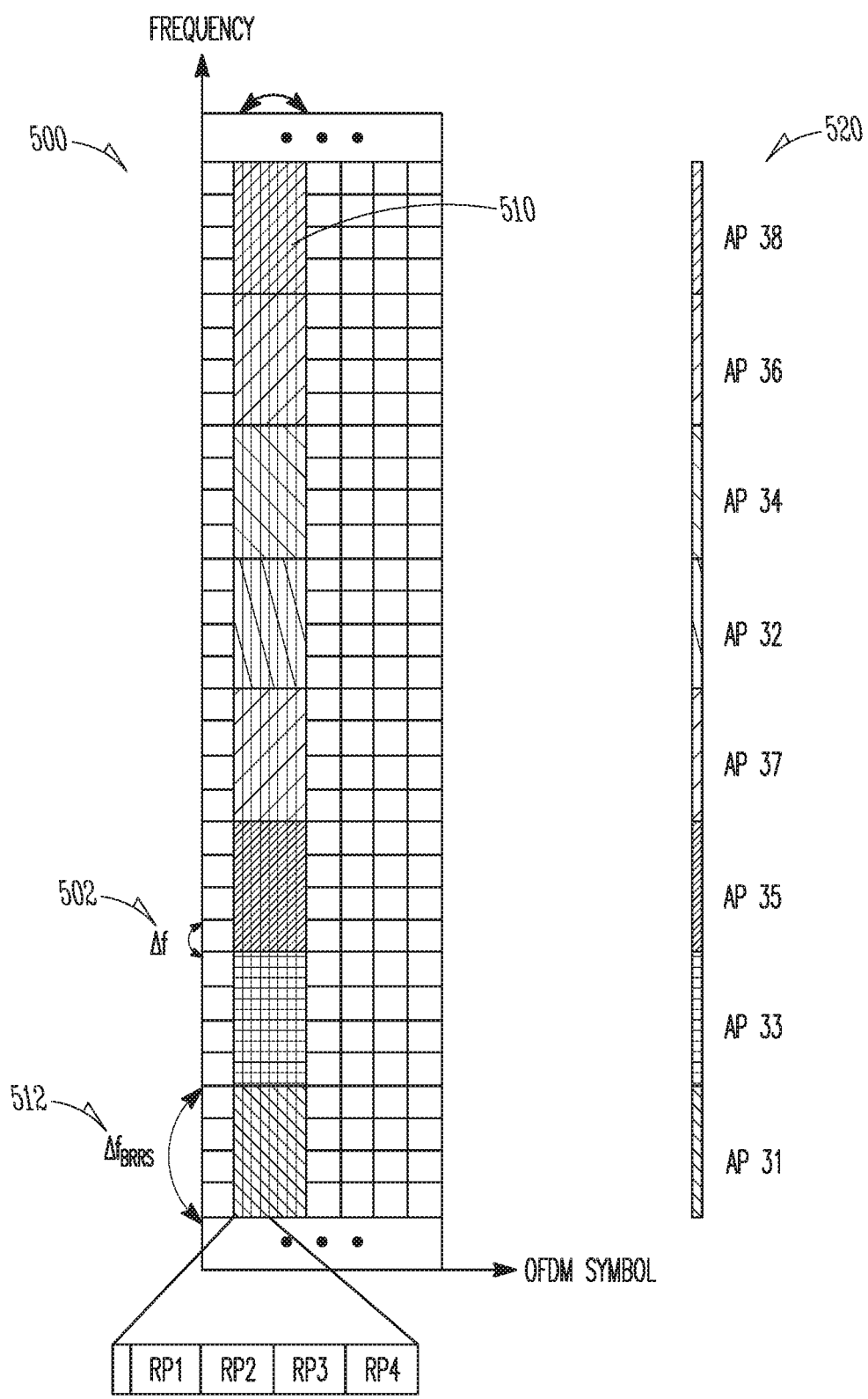
FIG. 5 illustrates a subframe comprising multiple Beam Refinement Reference Signals (BRRSs) in accordance with some embodiments.

FIG. 5 illustrates a subframe comprising multiple BRRS in accordance with some embodiments. As shown, the subframe 500 comprises resource elements 502 that occupy one subcarrier ($\Delta f$) in frequency and span one symbol in time. The subframe 500 also comprises multiple BRRSs 510 that occupy four subcarriers ($\Delta f_{BRRS}$) 512 in frequency and span multiple symbols in time. Each BRRS 510 comprises multiple BRRS symbols. In the embodiment shown, four BRRS symbols are repeated (denoted as RP # in FIG. 5) and transmitted within one OFDM symbol to reduce the BRRS overhead. The BRRS 510 may be transmitted on up to eight antenna ports (AP) 520, shown as AP 31-38. Adjacent APs 520 may be separated by two or three APs 520, and all of the BRRSs 510 may be contained within a particular frequency range with the BRRS 510 of each AP adjacent to the BRRS 510 of at least one other AP. The transmission and reception of the BRRSs 510 may be dynamically scheduled in the downlink resource allocation of the xPDCCH (not shown).

Figure 6A:
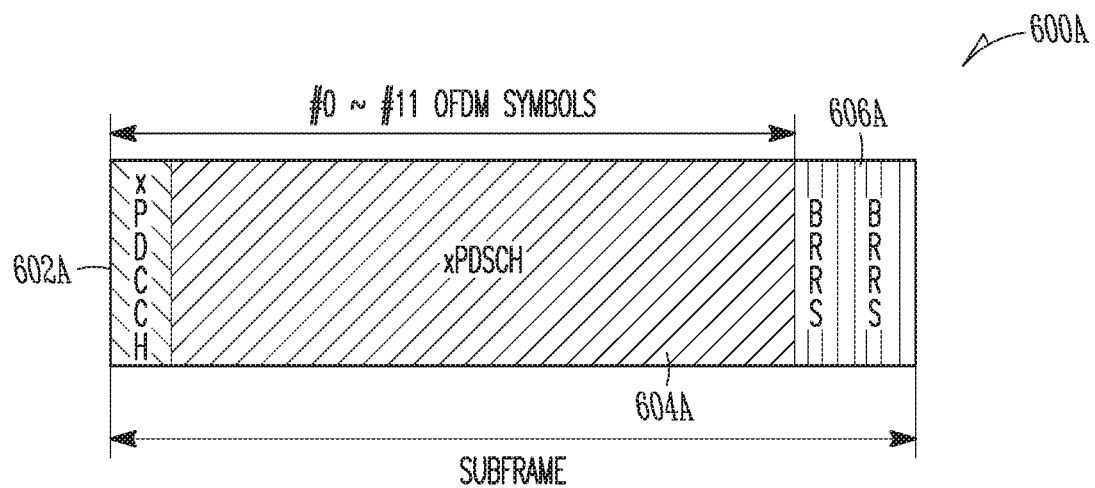
FIGS. 6A and 6B illustrate BRRS subframes comprising one or more BRRSs in accordance with some embodiments.
Figure 6B:
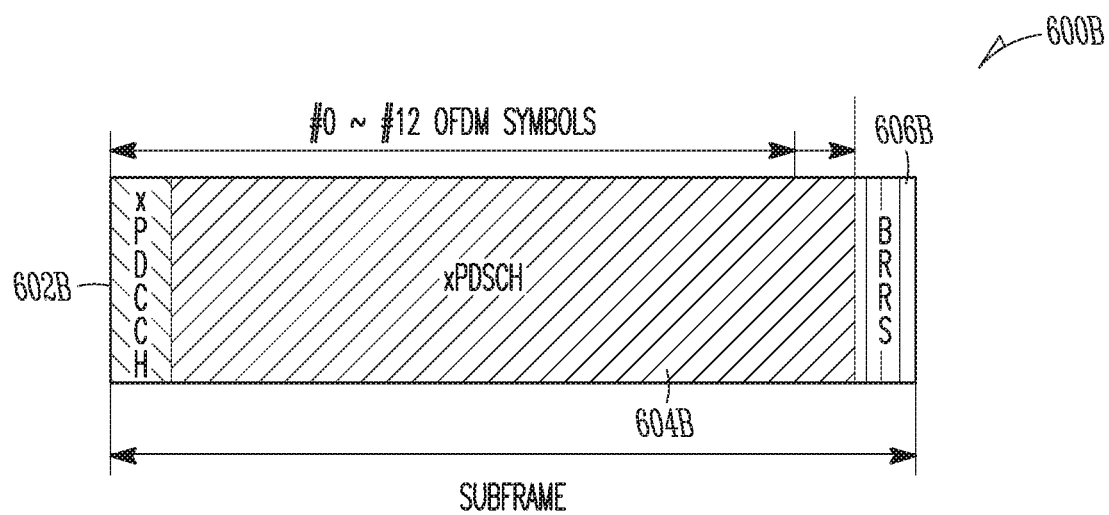

FIGS. 6A and 6B illustrate BRRS subframes comprising one or more BRRSs in accordance with some embodiments. The subframes 600A, 600B in FIGS. 6A and 6B may be TDD or FDD subframes and may contain an xPDCCH 602A, 602B, respectively, followed by an xPDSCH 604A, 604B, respectively. The xPDCCH 602A, 602B and xPDSCH 604A, 604B may occupy the first (initial) 12 OFDM symbols of the subframe 600A, 600B, assuming a normal length cyclical prefix. In some embodiments, the xPDCCH 602A, 602B and the xPDSCH 604A, 604B may occupy different places in the subframe 600A, 600B, for example the xPDSCH 604A, 604B may occupy the OFDM symbols before the xPDCCH 602A, 602B.

The BRRS region 606A, 606B may follow the xPDCCH 602A, 602B and xPDSCH 604A, 604B, respectively, and may occupy the remaining OFDM symbols. The BRRS region 606A, 606B may thus be contained within the last one OFDM symbol (FIG. 6B) or two OFDM symbols (FIG. 6A), and thus the BRRS may be transmitted using the last one (FIG. 6B) or two (FIG. 6A) OFDM symbols. The BRRS region 606A, 606B may be reserved within the xPDSCH 604A, 604B. As shown, multiple BRRSs may be transmitted in the BRRS region 606A, 606B of a single BRRS subframe 600A, 600B. In some embodiments, the xPDSCH 604A and BRRS of the BRRS region 606A in FIG. 6A may target (be allocated for) the same UE, while in other embodiments the xPDSCH 604A and the BRRS of the BRRS region 606A may target different UEs. Similarly, the xPDSCH 604B and BRRS of the BRRS region 606B in FIG. 69 may target the same UE, while in other embodiments the xPDSCH 604B and the BRRS of the BRRS region 606B may target different UEs.

In some embodiments, the last one or two OFDM symbols can be reserved for the BRRS of the BRRS region 606A, 606B by puncturing the indicator in the corresponding DCI, which also can be utilized to configure the resource reservation for the CSI-RS. This may permit the UE(s) to be scheduled for the xPDSCH 604A in the same BRRS subframe 600A while avoiding interference between the xPDSCH 604A and the BRRS of the BRRS region 606A in FIG. 6A, with the same being true in FIG. 6B. BRRS sequence-related parameters may also be configured in higher layer signaling via MIB, SIB or RRC signaling. Other information may be signaled in the DCI format for uplink grant and downlink assignment (or may be predefined), including the number of Tx ports for the BRRS and the Tx port index, the resource mapping type to indicate whether the sequence is localized or frequency-interleaved, the starting index of resource element or resource block or sub-band index used for the transmission of BRRS, the sequence length and/or the number of OFDM symbols for each of the RSs.

FIGS. 7A-7D illustrate subframes comprising one or more BRRSs in accordance with some embodiments. In some embodiments, the subframes shown in FIGS. 7A-7D may be special switching TDD subframes containing DL and UL portions. The subframe 700A in FIG. 7A may contain a guard period (GP) 708A followed by an xPUSCH 704A. The subframe 700B, 700C 700D in FIGS. 7B-7D may contain an xPDCCH 702B, 702C, 702D, respectively, followed by a GP 708B, 708C, 708D, respectively, and followed by an xPUSCH 704B, 704C, 704D, respectively. The xPUSCH 704A, 704B may occupy the terminal 12 OFDM symbols of the subframe 700A, 700B, respectively.

Figure 7A:
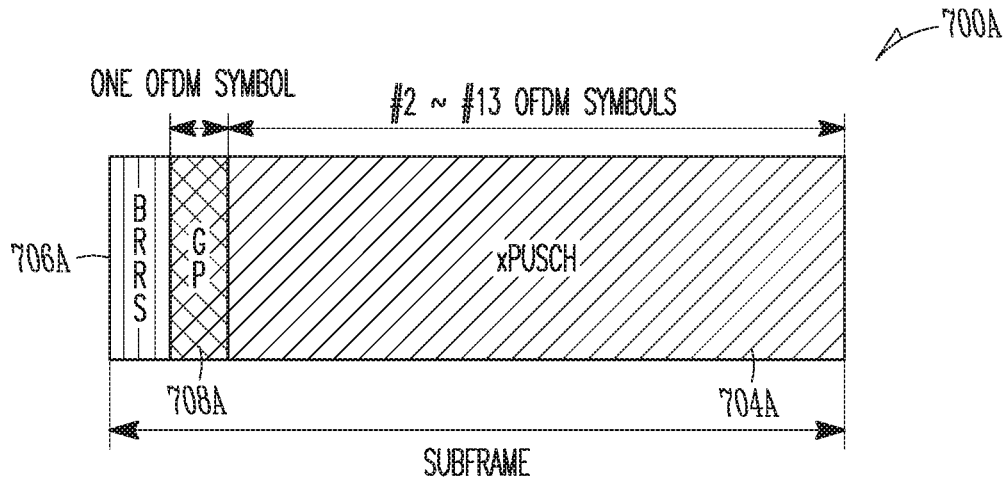
FIGS. 7A-7D illustrate BRRS subframes comprising one or more BRRSs in accordance with some embodiments.
Figure 7B:
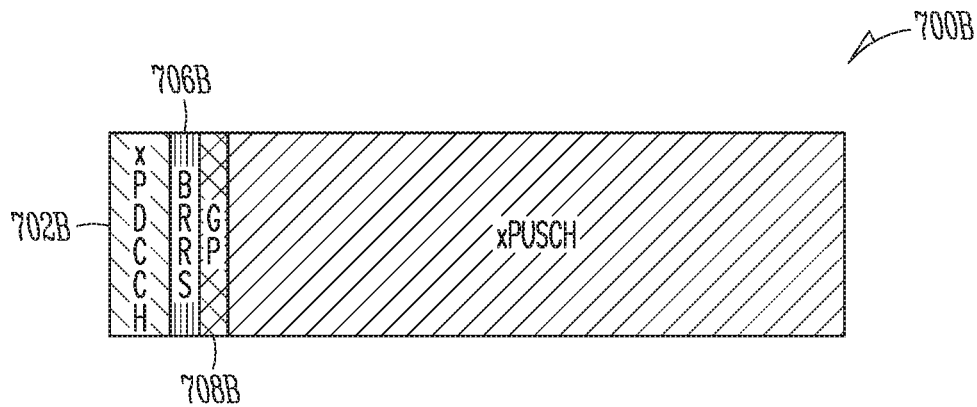

Unlike the BRRS subframes in FIGS. 6A and 6B, the BRRS region 706A, 706B may be disposed at the front of the BRRS subframe 700A, 700B, respectively. The BRRS of the BRRS region 706A, 706B may be transmitted at in either or both the first OFDM symbol (i.e., the initial OFDM symbol per FIG. 7A) or second OFDM symbol (i.e., the next OFDM symbol after the initial OFDM symbol per FIG. 79). In particular, the BRRS of the BRRS region 706A, 706B may be transmitted instead of the xPDCCH symbols (FIG. 7A), or be time division multiplexed (TDMed) with the GP 708B on the second OFDM symbol (FIG. 7B). The TDMed pattern between the GP 708B and the BRRS of the BRRS region 706B may be pre-defined or may be configured by high layer signaling such as a master information block (MIB), system information block (SIB) or RRC signaling. The pattern may include the timing of when/how often the GP 708B is replaced by the BRRS of the BRRS region 706B. In some embodiments, the BRRS of the BRRS region 706A, 706B may occupy the first two OFDM symbols of the BRRS subframe 700A, 700B, rather than merely the first or second OFDM symbol, as shown.

Figure 7C:
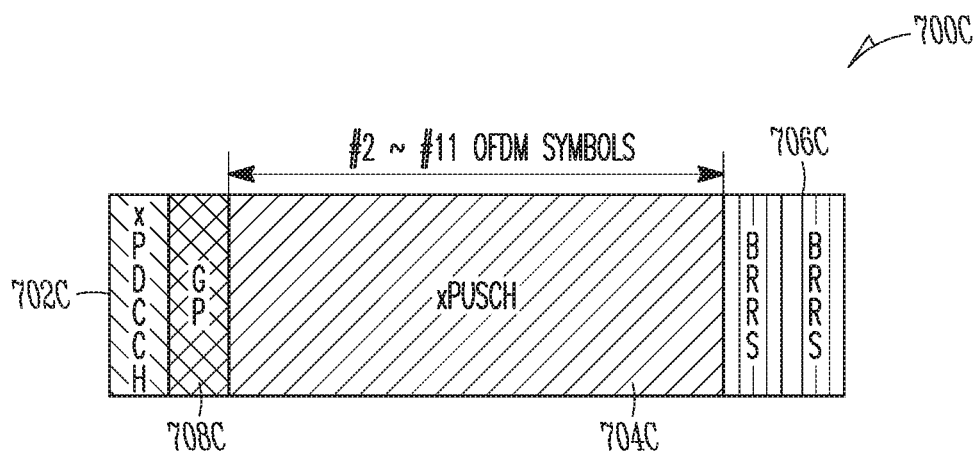
Figure 7D:
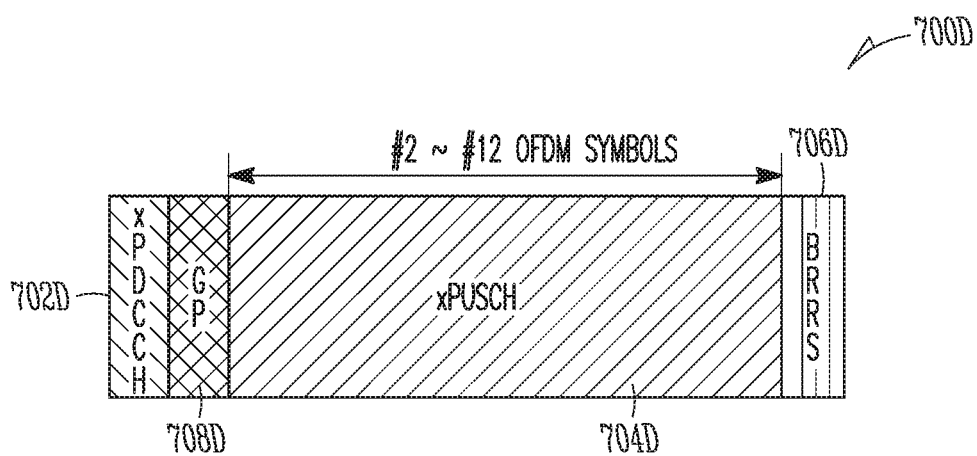

In other embodiments, similar to those of FIGS. 6A and 6B, the BRRS of the BRRS region 706C, 706C can be transmitted in the terminal OFDM symbols. As shown in FIGS. 7C and 7D, the BRRS of the BRRS region 706C, 706D may be transmitted after the xPUSCH 704C, 704D, respectively. The xPDCCH 702C, 702D, GP 708C, 708D and xPDSCH 704C, 704D may occupy the first 12 OFDM symbols (FIG. 7C) or the first 13 OFDM symbols (FIG. 7D) of the subframe 700C, 700D. The BRRS region 706C may include multiple BRRSs, or the BRRS region 706D may include a single BRRS.

Independent of which subframe 700A, 700B, 700C, 700D is used, in each subframe the xPUSCH 704A, 704B, 704C, 704D in the subframe and the BRRS of the BRRS region 706A, 706B, 706C, 706D in the subframe can be targeted to the same UE or may be targeted to different UEs. When the UEs are different, the first one or two OFDM symbols may be reserved for the BRRS of the BRRS region by puncturing an indicator in the corresponding DCI. This may also be utilized to configure the resource reservation for the xPDCCH 702B, 702C, 702D, and downlink/uplink switching GP 708A, 708B, 708C, 708D. In this way, the interference between the data in each xPUSCH 704A, 704B, 704C, 704D and each BRRS of the BRRS region 706A, 706B, 706C, 706D, respectively, can be avoided.

An indicator may be provided that indicates the position of the BRRS within the BRRS subframe. The indicator may be provided via different mechanisms. For example, in one embodiment the DCI may be configured with an additional 1-bit indicator to inform the UE whether the DMRS is transmitted in the first or last OFDM symbol(s). In some embodiments, multiple bits may be used to indicate the number of OFDM symbols as well as the location of the OFDM symbols within the BRRS subframe. In some embodiments, the indicator may be configured via higher layer signaling rather than, or in addition to, configuring the DCI.

In some embodiments, rather than the indicator providing an indication of the number of OFDM symbols, the starting OFDM symbol index for the BRRS may be determined by the cell ID, the virtual cell ID, BRRS ID (e.g., which AP is providing the BRRS) and/or the subframe index of the BRRS subframe. In some of these embodiments, different cells may allocate different resources, such as different APs, for BRRS transmission, which may reduce interference caused by the BRRS. Alternatively, if based on the subframe index, the starting OFDM symbol index for the BRRS may change with time. Thus, all of the cells may have the same starting OFDM symbol index for the BRR, which may be dependent on the subframe index, or the OFDM symbol index for the BRRS may be independent within each cell, being dependent on cell-specifics (ID) and perhaps subframe index.

In addition, in some embodiments, different cells may allocate different ports for BRRS transmission to avoid interference. In some embodiments, a periodic BRRS transmission opportunity may be configured. In this case, the period and subframe offset of the BRRS transmission opportunity may be configured by higher layer signaling. In some embodiments, for DL subframes in which the periodic BRRS transmission is enabled, the OFDM symbols reserved for BRRS transmission may be unable to be used for xPDSCH transmission.

Figure 8:
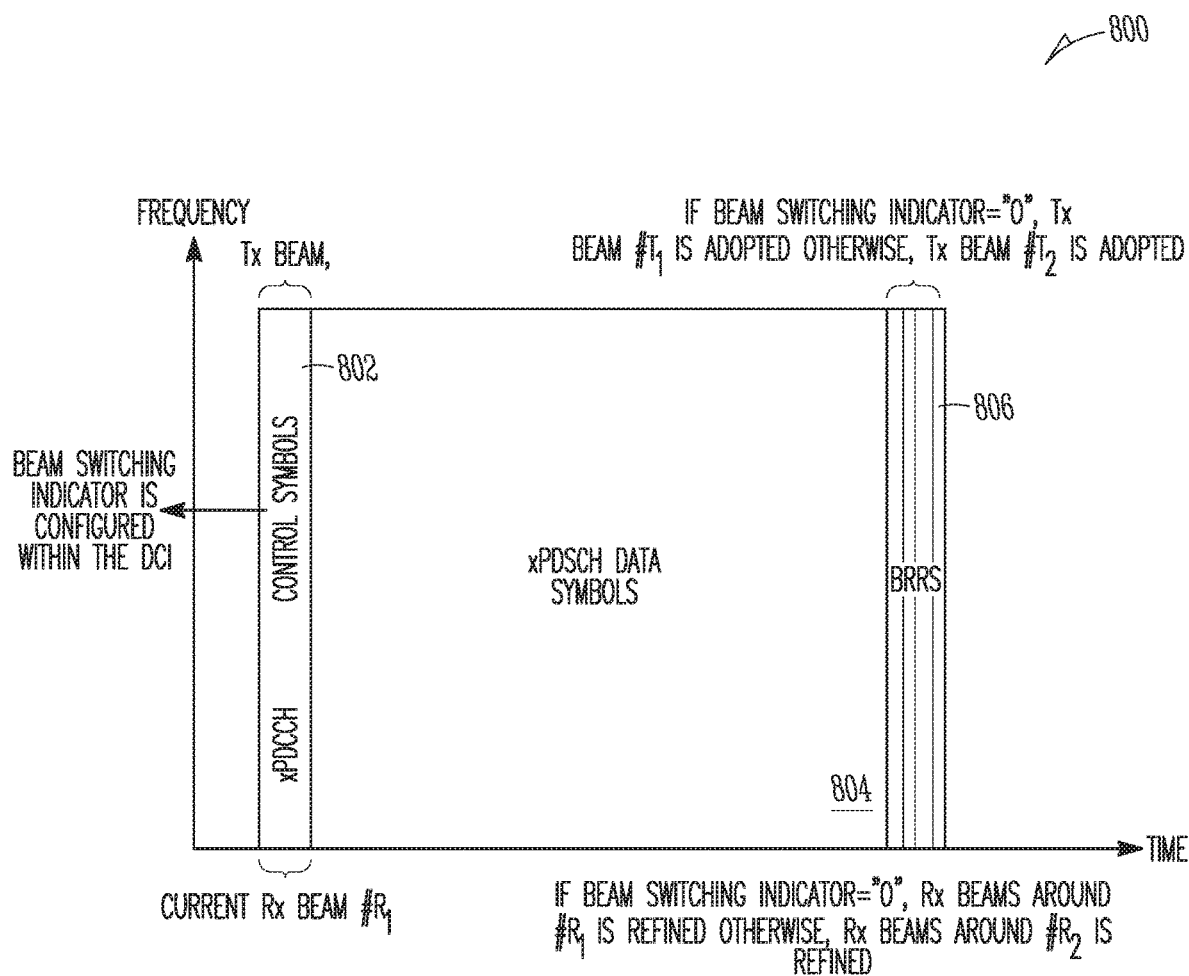
FIG. 8 illustrates a BRRS subframe in accordance with some embodiments.

FIG. 8 illustrates a BRRS subframe in accordance with some embodiments. The BRRS subframe 800 shown in FIG. 8 may provide one embodiment of the reservation of the symbols normally used for the xPDSCH by the BRRS shown in FIGS. 7A-7D. As shown, the BRRS subframe 800 contains an xPDCCH 802 configured in accordance with a DCI, an xPDSCH 804 and a BRRS region 806 containing a BRRS. The last one to two symbols of the xPDSCH 804 are reserved for the BRRS of the BRRS region 806. The xPDCCH 802 may be received using the current Rx beam, which was determined using a BRRS region in a previous BRRS subframe. When the channel quality of a candidate Tx/Rx beam pair becomes better than that of the current Tx/Rx beam, beam switching can be performed based on BRRS.

The DCI of the xPDCCH 802 may be configured with a 1-bit (or more) beam switching indicator that indicates where beam refinement is to occur using the BRRS. For example, the beam switching may take values of 0 and 1 to indicate whether to perform beam refinement around the current beam (for example, value 0) or whether to perform beam refinement around the candidate beam (for example, value 1). Similarly, the transmit beam used to provide feedback to the eNB may correspond to the current beam or to the candidate beam, dependent on the value of the beam switching indicator. The candidate beam may be determined by the UE via reference signal measurements. Thus, beam refinement may occur for a beam other than the currently used beam.

In some embodiments, a BRRS format can be introduced to realize abrupt beam switching by directly refining the candidate Rx beam. For example, a single OFDM symbol may be used to refine the Rx beam. However, as illustrated in FIG. 8, the UE may still use the current Rx beam for control symbol reception (reception of the xPDCCH 802), and refine the Rx beam around the candidate Rx beam. For BRRS transmission within one OFDM symbol, the format may contain refinement of the current Rx beam, e.g., measurement of 4 Rx beams around the current Rx beam, or refinement of the candidate Rx beam. e.g., measurement of Rx beams around the candidate Rx beam.

In some embodiments, use of a single OFDM symbol may yield insufficient results in refinement; thus two OFDM symbols may be used to enable enhanced refinement of the candidate Rx beam. Similar to the above, for BRRS transmission within two OFDM symbols, the format may contain refinement of the current Rx beam, e.g., measurement of 8

Rx beams around the current Rx beam, or refinement of the candidate Rx beam, e.g., measurement of 8 Rx beams around the candidate Rx beam. Alternatively, refinement around both the current Rx beam and the candidate Rx beam (e.g., 4 Rx beams around each) may be used.

Figure 9:
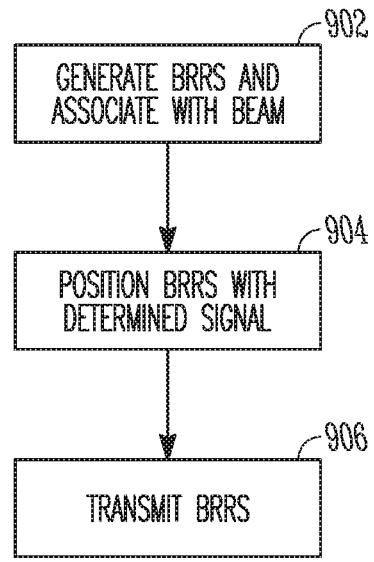
FIG. 9 is a flow diagram of operations performed by a transmitter-side baseband processor to provide reference signaling in support of dynamic, real-time receive-beam refinement in accordance with some embodiments.

FIG. 9 is a flow diagram of operations performed by a Tx-side baseband processor to provide reference signaling in support of dynamic, real-time Rx-beam refinement in accordance with some embodiments. The method may be performed by any of the communication devices shown and described in FIGS. 1-4. Embodiments of the method may thus include additional or fewer operations or processes in comparison to what is illustrated in FIG. 9. The flow diagram is not necessarily limited to the chronological order that is shown in FIG. 9. In addition, while the method and other methods described herein may refer to UEs and eNBs operating in accordance with 3GPP or other standards, embodiments of those methods are not limited to just those communication devices and may also be practiced by other communication devices.

At operation 902, a BRRS sequence may be generated and associated with a particular beam to be transmitted in a particular direction and used for communication by an eNB with a particular UE. The association may be based on previously-reported signal-reception quality for one or more beam directions by the UE. The BRRS may be configured to localized REs, or interleaved with other REs in the frequency domain. An indicator representing the association may be provided to the eNB transmitter circuitry to control the beam direction for the BRRS and ensure that the BRRS is sent using the same beam as the data. One or more BRRS sequences the one or more UEs may be generated for a particular BRRS subframe.

After the BRRS is generated at operation 902, the eNB may determine the position of the BRRS within the BRRS subframe at operation 904. The position may be within the control signal, guard period or data regions of the BRRS subframe and may occupy one or two OFDM symbols. The starting OFDM symbol for the BRRS may be dependent on the cell (such as the cell ID), dependent on the BRRS (BRRS ID), tuning (e.g., subframe index) and/or UE dependent if multiple BRRSs are present in the same BRRS subframe.

At operation 906, the eNB may transmit the BRRS to the UE. The BRRS may be positioned (TDMed in or reserved for) the appropriate BRRS subframe location determined in operation 904. Thus, the BRRS may be transmitted in place of control signals (xPDCCH), the guard period, or data (xPDSCH or xPUSCH). The DCI of the xPDCCH may be configured with a beam switching indicator that indicates to the UE which beam to use for beam refinement. The beam for the CSI-RS may be the same as the one used for the BRRS or may be different dependent on, for example, timing and UE mobility. The eNB may transmit information regarding the BRRS in the DCI or in higher layer signaling or the information may be provided per a 3GPP standard.

Figure 10:
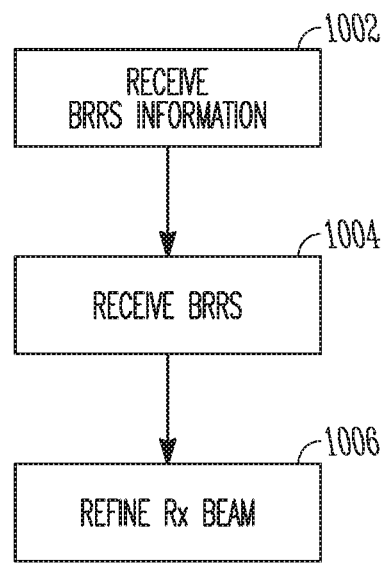
FIG. 10 is a flow diagram of receiver-side operations performed by a baseband processor for refining the Rx beam direction according to some embodiments.

FIG. 10 is a flow diagram of receiver-side operations performed by a baseband processor for refining the Rx beam direction according to some embodiments. The method may be performed by any of the communication devices shown and described in FIGS. 1-4. Embodiments of the method may thus include additional or fewer operations or processes in comparison to what is illustrated in FIG. 10. The flow diagram is not necessarily limited to the chronological order that is shown in FIG. 10. In addition, while the method and other methods described herein may refer to UEs operating in accordance with 3GPP or other standards, embodiments of those methods are not limited to just those communication devices and may also be practiced by other communication devices.

At operation 1002, the UE may receive BRRS information. The information may be provided dynamically, via a DCI, via higher layer signaling, or depending on the standard. The BRRS information may include parameters that define the resource mapping type for the BRSS, the starting index of resource element/resource block/subband index/OFDM symbol used for the transmission of BRRS, the sequence length, the number of OFDM symbols, coding information of the BRRS, the BRRS subframe and an indication of which beam to use for beam refinement.

At operation 1004, the UE may receive the BRRS. The BRRS may be received in the same subframe as the BRRS information or may be received afterwards, dependent on the delivery method of the BRRS information.

At operation 1006, the UE may refine the Rx beam. The UE may refine the Rx beam by varying the Rx beam direction while receiving the BRRS, which is provided in different Rx beam directions. While the BRRS is being received, the receive signal performance is measured. The UE may measure the RSRP, RSRQ or other performance-based aspects using the BRRS to determine the optimum available Rx beam. The UE may vary the Rx beam based on earlier performance measurements such that the Rx beam direction is varied incrementally in a direction that increases the performance measure. The optimal Rx beam may be selected and then used to receive the CSI-RS and to perform the channel-quality measurements thereupon, to be reported back to the eNB. When the BRRS occurs prior to data reception, the optimal Rx beam thus determined may be used to receive the CSI-RS and perform channel quality measurement based thereupon, as well as to receive or transmit data in the BRRS subframe. Otherwise, communication using the optimal Rx beam may occur in the next subframe.

ADDITIONAL NOTES AND EXAMPLES

Example 1 is an apparatus of user equipment (UE), the apparatus comprising: a memory; and processing circuitry in communication with the memory and arranged to: decode beam refinement reference signal (BRRS) information that indicates a position of a BRRS in a BRRS subframe; decode the BRRS received from an evolved NodeB (eNB); and during reception of the BRRS in the BRRS subframe, vary a receive (Rx) beam direction and measure a signal characteristic of the BRRS to determine a refined Rx beam direction.

In Example 2, the subject matter of Example 1 optionally includes, wherein: the BRRS subframe comprises 14 orthogonal frequency division multiplexed (OFDM) symbols, and the position of the BRRS comprises at least one OFDM symbol of a first two OFDM symbols in the BRRS subframe or a last two OFDM symbols in the BRRS subframe.

In Example 3, the subject matter of Example 2 optionally includes, wherein: the BRRS subframe comprises a 5th generation physical downlink shared channel (xPDSCH) in which OFDM symbols of the xPDSCH are reserved for the at least one OFDM symbol, and the BRRS information further comprises information that the xPDSCH and the BRRS are allocated to the UE.

In Example 4, the subject matter of any one or more of Examples 2-3 optionally include, wherein: the BRRS subframe comprises a 5th generation (5G) physical downlink shared channel (xPDSCH) in which OFDM symbols of the xPDSCH are reserved for the at least one OFDM symbol, and the BRRS information further comprises information that the xPDSCH and BRRS allocated to different UEs.

In Example 5, the subject matter of Example 4 optionally includes, wherein: the BRRS subframe comprises a 5G physical downlink control channel (xPDCCH) configured in accordance with a downlink control information (DCI), and for a UE scheduled for the xPDSCH, at least one of the last two of the OFDM symbols are reserved for the BRRS through the use of a punctured indicator of the DCI, which is used to configure a resource reservation for a channel state information reference signal (CSI-RS).

In Example 6, the subject matter of any one or more of Examples 2-5 optionally include, wherein: the BRRS subframe comprises a 5th generation (5G) physical uplink shared channel (xPUSCH) in which OFDM symbols of the xPUSCH are reserved for the at least one OFDM symbol, and the BRRS information fluffier comprises information that the xPUSCH and the BRRS are allocated to the UE.

In Example 7, the subject matter of any one or more of Examples 2-6 optionally include, wherein: the BRRS subframe comprises a 5th generation (5G) physical uplink shared channel (xPUSCH) in which OFDM symbols of the xPUSCH are reserved for the at least one OFDM symbol, and the BRRS information further comprises that the xPUSCH and the BRRS are allocated to different UEs.

In Example 8, the subject matter of any one or more of Examples 2-7 optionally include, further comprising: baseband circuitry configured to determine, from an indicator, which of the first and last two of the OFDM symbols in the BRRS subframe the BRRS is transmitted in, the indicator configured within one of a downlink control information (DCI) or provided to the UE via higher layer signaling.

In Example 9, the subject matter of any one or more of Examples 1-8 optionally include, wherein: the BRRS information further indicates that the BRRS comprises repeated BRRS symbols within one OFDM symbol.

In Example 10, the subject matter of any one or more of Examples 1-9 optionally include, wherein: the position of the BRRS comprises a first two OFDM symbols of the BRRS subframe or a last two OFDM symbols of the BRRS subframe, and the BRRS comprises repeated. BRRS symbols within each OFDM symbol.

In Example 11, the subject matter of any one or more of Examples 1-10 optionally include, wherein: the BRRS is positioned in an initial OFDM symbol of the BRRS subframe or is a time divisional multiplexed with a guard period (GP) on an OFDM symbol of the BRRS subframe adjacent to the initial OFDM symbol.

In Example 12, the subject matter of Example 11 optionally includes, wherein: the BRRS information further comprises a pattern of time divisional multiplexing between the GP and the BRRS, and the BRRS information is one of pre-defined or configured by higher layer signaling.

In Example 13, the subject matter of any one or more of Examples 11-12 optionally include, wherein: the BRRS subframe comprises a 5th generation (5G) physical downlink control channel (xPDCCH) configured in accordance with a downlink control information (DCI), and the BRRS information further comprises information that at least one of an initial two OFDM symbols in the BRRS subframe are reserved for the BRRS through the use of a punctured indicator of the DCI, which is used to configure resource reservation for the xPDCCH and the GP.

In Example 14, the subject matter of any one or more of Examples 1-13 optionally include, wherein at least one of the processing circuitry is further configured to determine a starting symbol index for the BRRS from at least one of a cell identifier (ID), a virtual cell ID, a BRRS ID or a subframe index, or different BRRS transmissions from different cells use different eNB antenna ports allocated by the different cells.

In Example 15, the subject matter of any one or more of Examples 1-14 optionally include, wherein: the BRRS is transmitted using a current Rx beam and a candidate Rx beam, and the processing circuitry is further configured to refine the candidate Rx beam as indicated by a BRRS format of the BRRS information.

In Example 16, the subject matter of Example 15 optionally includes, wherein: the BRRS format is selectable from among different BRRS formats that each indicate one of: current Rx beam refinement using a BRRS having a position that comprises a single OFDM symbol in the BRRS subframe, candidate Rx beam refinement using a BRRS having a position that comprises a single OFDM symbol in the BRRS subframe, current Rx beam refinement using a BRRS having a position that comprises multiple OFDM symbols in the BRRS subframe, candidate Rx beam refinement using a BRRS having a position that comprises multiple OFDM symbols in the BRRS subframe, and current and candidate Rx beam refinement using a BRRS having a position that comprises multiple OFDM symbols in the BRRS subframe.

In Example 17, the subject matter of any one or more of Examples 1-16 optionally include, further comprising: a plurality of antennas configured to provide communications between the UE and the eNB.

Example 18 is an apparatus of an evolved NodeB (eNB), the apparatus comprising: a memory; and processing circuitry in communication with the memory and arranged to: generate for transmission to a user equipment (UE) beam refinement reference signal (BRRS) information that indicates a position of a BRRS in a BRRS subframe comprising orthogonal frequency division multiplexed (OFDM) symbols including an initial pair of OFDM symbols at a front of the BRRS subframe and a terminal pair of OFDM symbols at an end of the BRRS subframe, a 5th generation (5G) physical downlink control channel. (xPDCCH) configured in accordance with a downlink control information (DCI), and a data channel, the BRRS information indicating that the position of the BRRS comprises at least one OFDM symbol of the initial or terminal pair of OFDM symbols; and generate the BRRS for transmission to the UE for receive (Rx) beam refinement, the BRRS comprising repeated BRRS symbols within at least one of the OFDM symbols in which the BRRS is present.

In Example 19, the subject matter of Example 18 optionally includes, wherein: the data channel comprises one of a 5G physical downlink shared channel (xPDSCH) or a 5G physical uplink shared channel (xPUSCH), and the BRRS information further indicates that the xPDSCH or xPUSCH and the BRRS are allocated to the UE.

In Example 20, the subject matter of any one or more of Examples 18-19 optionally include, wherein: the data channel comprises one of a 5G physical downlink shared channel (xPDSCH) or a 5G physical uplink shared channel (xPUSCH), and the BRRS information further indicates that the xPDSCH or xPUSCH and the BRRS are allocated to different UEs.

In Example 21, the subject matter of any one or more of Examples 18-20 optionally include, wherein: the data channel comprises a 5G physical downlink shared channel (xPDSCH), and for a UE scheduled for the xPDSCH, at least one of the initial pair or terminal pair of OFDM symbols are reserved for the BRRS through the use of a punctured indicator of the DCI, which is used to configure a resource reservation for a channel state information reference signal (CSI-RS).

In Example 22, the subject matter of any one or more of Examples 18-21 optionally include, wherein the processing circuitry is further configured to: provide a single hit indicator configured within the DCI or via higher layer signaling, the indicator indicating the position of the BRRS.

In Example 23, the subject matter of any one or more of Examples 18-22 optionally include, wherein: the BRRS is positioned in an initial OFDM symbol of the BRRS subframe or is time divisional multiplexed with a guard period (GP) on an OFDM symbol of the BRRS subframe adjacent to the initial OFDM symbol, and the BRRS information further comprises at least one of: a pattern of time divisional multiplexing between the GP and the BRRS, or information that at least one OFDM symbol of the initial pair of OFDM symbols is reserved for the BRRS through the use of a punctured indicator of the DCI, which is used to configure resource reservation for the xPDCCH and the GP.

In Example 24, the subject matter of any one or more of Examples 18-23 optionally include, wherein: the BRRS information further comprises a starting symbol index for the BRRS based on at least one of a cell identifier (ID), a virtual cell ID, a BRRS ID or a subframe index.

In Example 25, the subject matter of any one or more of Examples 18-24 optionally include, wherein: the BRRS is transmitted via a current Rx beam and a candidate Rx beam, and a BRRS format that indicates which of the current Rx beam and a candidate Rx beam for the UE to refine is selectable from among different BRRS formats that each indicate one of current Rx beam refinement using a BRRS having a position that comprises a single OFDM symbol in the BRRS subframe, candidate Rx beam refinement using a BRRS having a position that comprises a single OFDM symbol in the BRRS subframe, current Rx beam refinement using a BRRS having a position that comprises multiple OFDM symbols in the BRRS subframe, candidate Rx beam refinement using a BRRS having a position that comprises multiple OFDM symbols in the BRRS subframe, and current and candidate Rx beam refinement using a BRRS having a position that comprises multiple OFDM symbols in the BRRS subframe.

In Example 26, the subject matter of any one or more of Examples 18-25 optionally include, wherein: the BRRS information comprises a period and subframe offset of a periodic BRRS transmission opportunity.

Example 27 is a computer-readable storage medium that stores instructions for execution by one or more processors of user equipment (UE), the one or more processors to configure the UE to: receive from an evolved NodeB (eNB) beam refinement reference signal (BRRS) information that indicates a position of a BRRS in a 5th generation (5G) physical downlink control channel (xPDCCH) configured in accordance with a downlink control information (DCI), a guard period (GP), a 5G physical downlink shared channel (xPDSCH), or a 5G physical uplink shared channel (xPUSCH) of a BRRS subframe; and receive from the eNB the BRRS for receive (Rx) beam refinement, the BRRS replacing orthogonal frequency division multiplexed (OFDM) symbols of the xPDCCH, replacing a portion of the OFDM symbols of the xPDSCH or xPUSCH, or time-division multiplexed with the GP.

In Example 28, the subject matter of Example 27 optionally includes, wherein the one or more processors further configure the UE to: determine that the xPDSCH or xPUSCH and the BRRS are allocated to the UE or to different UEs based on the BRRS information.

In Example 29, the subject matter of any one or more of Examples 27-28 optionally include, wherein: the BRRS information further comprises a starting symbol index for the BRRS based on at least one of a cell identifier (ID), a virtual cell ID, a BRRS ID, or a subframe index.

In Example 30, the subject matter of any one or more of Examples 27-29 optionally include, wherein: the BRRS is received via a current Rx beam and a candidate Rx beam, and a BRRS format that indicates which of the current Rx beam and a candidate Rx beam for the UE to refine is selectable from among different BRRS formats that each indicate one of current Rx beam refinement using a BRRS having a position that comprises a single OFDM symbol in the BRRS subframe, candidate Rx beam refinement using a BRRS having a position that comprises a single OFDM symbol in the BRRS subframe, current Rx beam refinement using a BRRS having a position that comprises multiple OFDM symbols in the BRRS subframe, candidate Rx beam refinement using a BRRS having a position that comprises multiple OFDM symbols in the BRRS subframe, and current and candidate Rx beam refinement using a BRRS having a position that comprises multiple OFDM symbols in the BRRS subframe.

Example 31 is a method of refining receive beamforming in a user equipment (UE), the method comprising: receiving from an evolved NodeB (eNB) beam refinement reference signal (BRRS) information that indicates a position of a BRRS in a 5th generation (5G) physical downlink control channel (xPDCCH) configured in accordance with a downlink control information (DCI), a guard period (GP), a 5G physical downlink shared channel (xPDSCH), or a 5G physical uplink shared channel (xPUSCH) of a BRRS subframe; and receiving from the eNB the BRRS for receive (Rx) beam refinement, the BRRS replacing orthogonal frequency division multiplexed (OFDM) symbols of the xPDCCH, replacing a portion of the OFDM symbols of the xPDSCH or xPUSCH, or time-division multiplexed with the GP.

In Example 32, the subject matter of Example 31 optionally includes, further comprising: determining that the xPDSCH or xPUSCH and the BRRS are allocated to the UE or to different UEs based on the BRRS information.

In Example 33, the subject matter of any one or more of Examples 31-32 optionally include, wherein: the BRRS information further comprises a starting symbol index for the BRRS based on at least one of a cell identifier (ID), a virtual cell ID, a BRRS m or a subframe index.

In Example 34, the subject matter of any one or more of Examples 31-33 optionally include, wherein: the BRRS is received via a current Rx beam and a candidate Rx beam, and a BRRS format that indicates which of the current Rx beam and a candidate Rx beam for the UE to refine is selectable from among different BRRS formats that each indicate one of: current Rx beam refinement using a BRRS having a position that comprises a single OFDM symbol in the BRRS subframe, candidate Rx beam refinement using a BRRS having a position that comprises a single OFDM symbol in the BRRS subframe, current Rx beam refinement using a BRRS having a position that comprises multiple OFDM symbols in the BRRS subframe, candidate Rx beam refinement using a BRRS having a position that comprises multiple OFDM symbols in the BRRS subframe, and current and candidate Rx beam refinement using a BRRS having a position that comprises multiple OFDM symbols in the BRRS subframe.

Example 35 is an apparatus of a user equipment (UE), the apparatus comprising: means for receiving from an evolved NodeB (eNB) beam refinement reference signal (BRRS) information that indicates a position of a BRRS in a 5th generation (5G) physical downlink control channel (xPDCCH) configured in accordance with a downlink control information (DCI), a guard period (GP), a 5G physical downlink shared channel (xPDSCH), or a 5G physical uplink shared channel (xPUSCH) of a BRRS subframe; and means for receiving from the eNB the BRRS for receive (Rx) beam refinement, the BRRS replacing orthogonal frequency division multiplexed (OFDM) symbols of the xPDCCH, replacing a portion of the OFDM symbols of the xPDSCH or xPUSCH, or time-division multiplexed with the GP.

In Example 36, the subject matter of Example 35 optionally includes, further comprising: means for determining that the xPDSCH or xPUSCH and the BRRS are allocated to the UE or to different UEs based on the BRRS information.

In Example 37, the subject matter of any one or more of Examples 35-36 optionally include, wherein: the BRRS information further comprises a starting symbol index for the BRRS based on at least one of a cell identifier (ID), a virtual cell ID, a BRRS ID or a subframe index.

In Example 38, the subject matter of any one or more of Examples 35-37 optionally include, wherein: the BRRS is received via a current Rx beam and a candidate Rx beam, and a BRRS format that indicates which of the current Rx beam and a candidate Rx beam for the UE to refine is selectable from among different BRRS formats that each indicate one of current Rx beam refinement using a BRRS having a position that comprises a single OFDM symbol in the BRRS subframe, candidate Rx beam refinement using a BRRS having a position that comprises a single OFDM symbol in the BRRS subframe, current Rx beam refinement using a BRRS having a position that comprises multiple OFDM symbols in the BRRS subframe, candidate Rx beam refinement using a BRRS having a position that comprises multiple OFDM symbols in the BRRS subframe, and current and candidate Rx beam refinement using a BRRS having a position that comprises multiple OFDM symbols in the BRRS subframe.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed.

Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:
1. An apparatus, comprising:
 a non-transitory memory medium comprising program instructions; and
 a processor configured execute the program instructions to cause a user equipment device (UE) to:
  receive, in a first subframe, from a base station, reference signal information that indicates a position of a reference signal;
  determine a first transmit (Tx) beam of the base station indicated by a downlink control information (DCI), wherein the DCI schedules transmission of a physical downlink shared channel (PDSCH);
  receive, from the base station, the reference signal in a first one or more orthogonal frequency division multiplexed (OFDM) symbols of the first subframe according to the reference signal information while varying a receive (Rx) beam of the UE associated with the first Tx beam of the base station and measuring a signal characteristic of the reference signal;
  determine, based on said measuring, a refined Rx beam of the UE; and receive, from the base station, the PDSCH in a second one or more OFDM symbols of the first subframe, wherein the PDSCH is received using the refined Rx beam of the UE.

2. The apparatus of claim 1, wherein the reference signal information is received in the DCI.

3. The apparatus of claim 1, wherein the reference signal information is received in higher layer signaling.

4. The apparatus of claim 1, wherein:
the reference signal information further comprises a starting symbol index for the reference signal based on at least one of a cell identifier (ID) associated with the base station, a virtual cell ID associated with the base station, a reference signal ID, or a subframe index.

5. The apparatus of claim 1, wherein:
the reference signal is received via both a current Rx beam and a candidate Rx beam during the first one or more OFDM symbols of the first subframe.

6. The apparatus of claim 5, wherein:
a reference signal format that indicates which of the current Rx beam and a candidate Rx beam for the UE to refine is selectable from among different reference signal formats that each indicate one of:
current Rx beam refinement using a reference signal having a position that comprises a single OFDM symbol in a subframe,
candidate Rx beam refinement using a reference signal having a position that comprises a single OFDM symbol in the subframe,
current Rx beam refinement using a reference signal having a position that comprises multiple OFDM symbols in the subframe,
candidate Rx beam refinement using a reference signal having a position that comprises multiple OFDM symbols in the subframe, and
current and candidate Rx beam refinement using a reference signal having a position that comprises multiple OFDM symbols in the subframe.

7. The apparatus of claim 1, wherein:
the reference signal information comprises a period and subframe offset of a periodic reference signal transmission opportunity.

8. The apparatus of claim 1, wherein a single bit indicator indicates that the position of the reference signal is in the first one or more OFDM symbols of the first subframe.

9. The apparatus of claim 1, wherein the processor is further configured to cause the UE to:
transmit, to the base station, feedback based on the signal characteristic of the reference signal using a selected Tx beam of the UE corresponding to the refined Rx beam of the UE.

10. The apparatus of claim 1, wherein the reference signal comprises channel state information reference signal (CSI-RS).

11. A user equipment device (UE), comprising:
a radio; and
a processor operably connected to the radio and configured to cause the UE to:
receive, in a first subframe, from a base station, reference signal information that indicates a position of a reference signal;
determine a first transmit (Tx) beam of the base station indicated by a downlink control information (DCI), wherein the DCI schedules transmission of a physical downlink shared channel (PDSCH);
receive, from the base station, the reference signal in a first one or more orthogonal frequency division multiplexed (OFDM) symbols of the first subframe according to the reference signal information while varying a receive (Rx) beam of the UE associated with the first Tx beam of the base station and measuring a signal characteristic of the reference signal;
determine, based on said measuring, a refined Rx beam of the UE; and
receive, from the base station, the PDSCH in a second one or more OFDM symbols of the first subframe, wherein the PDSCH is received using the refined Rx beam of the UE.

12. The UE of claim 11, wherein the reference signal information is received in the DCI.

13. The UE of claim 11, wherein the reference signal information is received in higher layer signaling.

14. The UE of claim 11, wherein:
the reference signal information further comprises a starting symbol index for the reference signal based on at least one of a cell identifier (ID) associated with the base station, a virtual cell ID associated with the base station, a reference signal ID, or a subframe index.

15. The UE of claim 11, wherein:
the reference signal is received via both a current Rx beam and a candidate Rx beam during the first one or more OFDM symbols of the first subframe.

16. The UE of claim 15, wherein:
a reference signal format that indicates which of the current Rx beam and a candidate Rx beam for the UE to refine is selectable from among different reference signal formats that each indicate one of:
current Rx beam refinement using a reference signal having a position that comprises a single OFDM symbol in a subframe,
candidate Rx beam refinement using a reference signal having a position that comprises a single OFDM symbol in the subframe,
current Rx beam refinement using a reference signal having a position that comprises multiple OFDM symbols in the subframe,
candidate Rx beam refinement using a reference signal having a position that comprises multiple OFDM symbols in the subframe, and
current and candidate Rx beam refinement using a reference signal having a position that comprises multiple OFDM symbols in the subframe.

17. The UE of claim 11, wherein:
the reference signal information comprises a period and subframe offset of a periodic reference signal transmission opportunity.

18. The UE of claim 11, wherein a single bit indicator indicates that the position of the reference signal is in the first one or more OFDM symbols of the first subframe.

19. The UE of claim 11, wherein the processor is further configured to cause the UE to:
transmit, to the base station, feedback based on the signal characteristic of the reference signal using a selected Tx beam of the UE corresponding to the refined Rx beam of the UE.

20. The UE of claim 11, wherein the reference signal comprises channel state information reference signal (CSI-RS).

21. A method, comprising:
at a user equipment device (LE):
receiving, in a first subframe, from a base station, reference signal information that indicates a position of a reference signal;

determining a first transmit (Tx) beam of the base station indicated by a downlink control information (DCI), wherein the DCI schedules transmission of a physical downlink shared channel (PDSCH);

receiving, from the base station, the reference signal a first one or more orthogonal frequency division multiplexed (OFDM) symbols of the first subframe according to the reference signal information while varying a receive (Rx) beam of the UE associated with the first Tx beam of the base station and measuring a signal characteristic of the reference signal;

determining, based on said measuring, a refined Rx beam of the UE; and receiving, from the base station, the PDSCH in a second one or more OFDM symbols of the first subframe, wherein the PDSCH is received using the refined Rx beam of the UE.

22. The method of claim 21, wherein the reference signal information is received in the DCI.

23. The method of claim 21, wherein the reference signal information is received in higher layer signaling.

24. The method of claim 21, wherein:
the reference signal information further comprises a starting symbol index for the reference signal based on at least one of a cell identifier (ID) associated with the base station, a virtual cell ID associated with the base station, a reference signal ID, or a subframe index.

25. The method of claim 21, wherein:
the reference signal is received via both a current Rx beam and a candidate Rx beam during the first one or more OFDM symbols of the first subframe.

26. The method of claim 25, wherein:
a reference signal format that indicates which of the current Rx beam and a candidate Rx beam for the LTE to refine is selectable from among different reference signal formats that each indicate one of:
current Rx beam refinement using a reference signal having a position that comprises a single OFDM symbol in a subframe,
candidate Rx beam refinement using a reference signal having a position that comprises a single OFDM symbol in the subframe,
current Rx beam refinement using a reference signal having a position that comprises multiple OFDM symbols in the subframe,
candidate Rx beam refinement using a reference signal having a position that comprises multiple OFDM symbols in the subframe, and
current and candidate Rx beam refinement using a reference signal having a position that comprises multiple OFDM symbols in the subframe.

27. The method of claim 21, wherein:
the reference signal information comprises a period and subframe offset of a periodic reference signal transmission opportunity.

28. The method of claim 21, wherein a single bit indicator indicates that the position of the reference signal is in the first one or more OFDM symbols of the first subframe.

29. The method of claim 21, wherein further comprising:
transmitting, to the base station, feedback based on the signal characteristic of the reference signal using a selected Tx beam of the UE corresponding to the refined Rx beam of the UE.

30. The method of claim 21, wherein the reference signal comprises channel state information reference signal (CSI-RS).

* * * * *